US007975777B2

(12) United States Patent
Krondorfer et al.

(10) Patent No.: US 7,975,777 B2

(45) Date of Patent: Jul. 12, 2011

(54) CELLULAR FOAM BUMPER FOR NAILER

(75) Inventors: Harald Krondorfer, Aurora, OH (US); Yizhuo Zhang, Arlington Heights, IL (US)

(73) Assignee: Robert Bosch GmbH, Stuttgart (DE)

( * ) Notice: Subject to any disclaimer, the term of this patent is extended or adjusted under 35 U.S.C. 154(b) by 285 days.

(21) Appl. No.: 12/340,097

(22) Filed: Dec. 19, 2008

(65) Prior Publication Data

US 2010/0155097 A1 Jun. 24, 2010

(51) Int. Cl.
*B23B 45/16* (2006.01)

(52) U.S. Cl. ......................... 173/210; 173/206; 173/218

(58) Field of Classification Search .................. 173/210, 173/206, 218; 227/10

See application file for complete search history.

(56) References Cited

U.S. PATENT DOCUMENTS 3,104,395 A 9/1963 Grey, Jr. et al.
3,496,840 A 2/1970 Wendel et al.
3,661,216 A * 5/1972 Yamanaka ...................... 173/17
3,969,989 A 7/1976 Maurer et al.
4,188,858 A 2/1980 Plunkett
4,401,251 A * 8/1983 Nikolich ...................... 227/130
4,441,644 A 4/1984 Farian
4,509,669 A 4/1985 Elliesen
4,549,344 A * 10/1985 Nikolich ......................... 29/432
4,932,480 A 6/1990 Golsch
5,056,701 A * 10/1991 Bereiter .......................... 227/10
5,131,579 A * 7/1992 Okushima et al. ................ 227/8
5,437,339 A * 8/1995 Tanaka .......................... 173/210
5,441,192 A * 8/1995 Sugita et al. .................. 227/130
6,145,727 A * 11/2000 Mukoyama et al. .......... 227/130
6,318,239 B1 * 11/2001 Tsukada ....................... 92/85 R
6,619,527 B1 * 9/2003 Moeller .......................... 227/10
6,648,202 B2 * 11/2003 Miller et al. .................. 227/130
6,695,192 B1 * 2/2004 Kwok ............................... 227/8
6,779,698 B2 * 8/2004 Lin ............................... 227/130
6,779,699 B2 * 8/2004 Aoki et al. .................... 227/130
7,316,341 B2 * 1/2008 Schnell et al. ................ 227/130
2010/0038397 A1 * 2/2010 Krondorfer et al. .............. 227/8

FOREIGN PATENT DOCUMENTS

GB 1132954 11/1968
WO 2007142997 12/2007

OTHER PUBLICATIONS

European Search Report in corresponding European application (i.e., EP 09 17 9292), mailed May 18, 2010 (2 pages).

* cited by examiner

*Primary Examiner* — Brian D Nash

(74) *Attorney, Agent, or Firm* — Maginot, Moore & Beck

(57) ABSTRACT

A device for impacting a fastener in one embodiment includes a drive channel, a cylinder opening at an end portion to the drive channel, a microcellular polyurethane elastomer (MPE) bumper fixedly positioned at the end portion of the cylinder, the MPE bumper including a drive bore extending therethrough and aligned with the drive channel, and an outer wall defining a plurality of grooves extending radially about the MPE bumper, and a drive mechanism including a drive blade aligned with the drive bore.

14 Claims, 3 Drawing Sheets

CELLULAR FOAM BUMPER FOR NAILER

FIELD OF THE INVENTION

This invention relates to the field of devices used to drive fasteners into work pieces and particularly to a device for impacting fasteners into work pieces.

BACKGROUND

Fasteners such as nails and staples are commonly used in projects ranging from crafts to building construction. While manually driving such fasteners into a work piece is effective, a user may quickly become fatigued when involved in projects requiring a large number of fasteners and/or large fasteners. Moreover, proper driving of larger fasteners into a work piece frequently requires more than a single impact from a manual tool.

In response to the shortcomings of manual driving tools, power-assisted devices for driving fasteners into wood and other materials have been developed. Contractors and homeowners commonly use such devices for driving fasteners ranging from brad nails used in small projects to common nails which are used in framing and other construction projects. Compressed air has been traditionally used to provide power for the power-assisted devices. Specifically, a source of compressed air is used to actuate a piston assembly which impacts a nail into the work-piece.

The energy stored within the piston assembly is typically more than the amount of energy required to drive a nail or other fastener into a work piece. Accordingly, as the piston assembly reaches the end of a full stroke, a substantial amount of energy remains in the moving components of the piston assembly. A bumper is commonly located at the end of the piston assembly to arrest the moving components and to absorb the energy stored therein. Nitrile rubber is commonly used to fabricate such bumpers.

Nitrile rubber bumpers are very effective at absorbing the kinetic energy from the piston assembly. The heavy shock loads to which the bumper is subjected, however, ultimately results in wear and eventual disintegration of the bumper. Accordingly, the bumper component is prone to frequent failure and is one of the most frequently serviced components of a pneumatic nailer. A typical service life of a nitrile rubber bumper is on the order of 150,000 to 250,000 firings.

What is needed is a device incorporating an element which can be used to absorb kinetic energy from a drive mechanism. What is further needed is a device incorporating an element which is simple, reliable, lightweight, and compact. A further need exists for a device that incorporates a energy absorbing element that has a long useful lifetime.

SUMMARY

In accordance with one embodiment, there is provided a device for impacting a fastener which includes a drive channel, a cylinder opening at an end portion to the drive channel, a microcellular polyurethane elastomer (MPE) bumper fixedly positioned at the end portion of the cylinder, the MPE bumper including a drive bore extending therethrough and aligned with the drive channel, and an outer wall defining a plurality of grooves extending radially about the MPE bumper, and a drive mechanism including a drive blade aligned with the drive bore.

In accordance with another embodiment, there is provided a device for impacting a fastener including a drive channel, a cylinder including a first end portion in communication with the drive channel, a second end portion spaced apart from the first end portion, and a cylinder wall extending between the first end portion and the second end portion, a microcellular polyurethane elastomer (MPE) bumper fixedly positioned at the first end portion of the cylinder, the MPE bumper including a drive bore extending axially therethrough and aligned with the drive channel, and an outer wall extending radially about the MPE bumper, the outer wall spaced apart from the cylinder wall about the circumference of the cylinder, and a drive mechanism including a drive blade aligned with the drive bore.

In accordance with a further embodiment, a device for impacting a fastener includes a drive channel, a cylinder including a first end portion in communication with the drive channel, a second end portion spaced apart from the first end portion, and a cylinder wall extending between the first end portion and the second end portion, a microcellular polyurethane elastomer (MPE) bumper fixedly positioned at the first end portion of the cylinder, a drive bore extending axially from an upper surface of the MPE bumper to a lower surface of the MPE bumper and aligned with the drive channel, a throat portion within the drive bore, a first conical portion extending upwardly and outwardly from the throat portion toward the upper surface of the MPE bumper, and a drive mechanism including a drive blade aligned with the drive bore and configured to impact the upper surface of the MPE bumper.

DESCRIPTION

Figure 1:
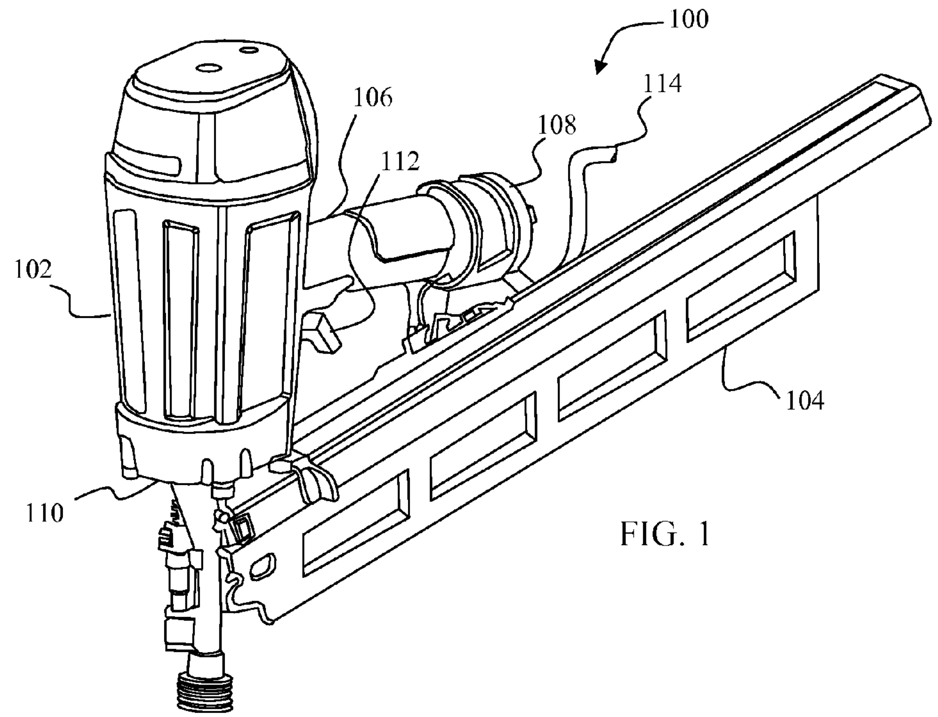
FIG. 1 depicts a front perspective view of a fastener impacting device in accordance with principles of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 depicts a fastener impacting device 100 including a housing 102 and a fastener cartridge 104. The housing 102 defines a handle portion 106, an air receptacle portion 108 and a drive section 110. The fastener cartridge 104 in this embodiment is spring biased to force fasteners, such as nails or staples, serially one after the other, into a loaded position adjacent the drive section 110. A trigger 112 extends outwardly from the housing 102 and controls the supply of compressed air which is provided from a source of compressed air through an air supply hose 114.

Figure 2:
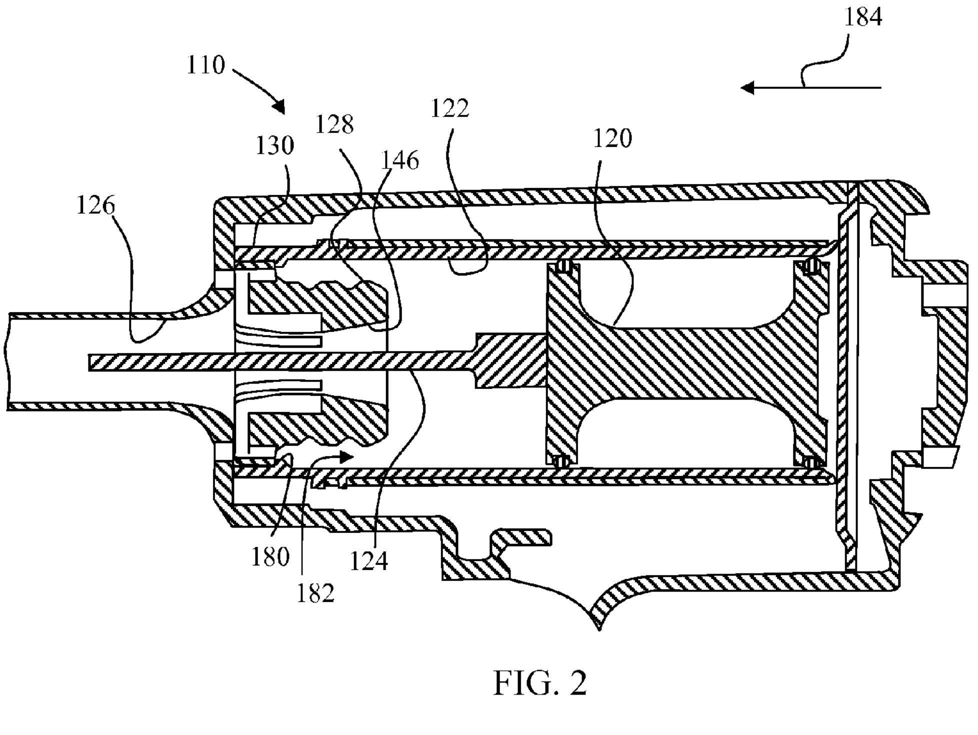
FIG. 2 depicts a partial simplified side cross sectional view of the drive section of the fastener impacting device of FIG. 1 with a microcellular polyurethane elastomer bumper fixed at one end of a cylinder and including an extension area spaced apart from the cylinder wall by a gap.

Referring now to FIG. 2, which is a simplified depiction of the internal components of the drive section 110, a piston 120 is located within a cylinder 122. A drive blade 124 is located at one end of the piston 120 and aligned with a drive channel 126 into which a fastener to be driven is forced by the fastener cartridge 104. A bumper 128 is positioned at the end portion 130 of the cylinder 122 which opens to the drive channel 126.

Figure 3:
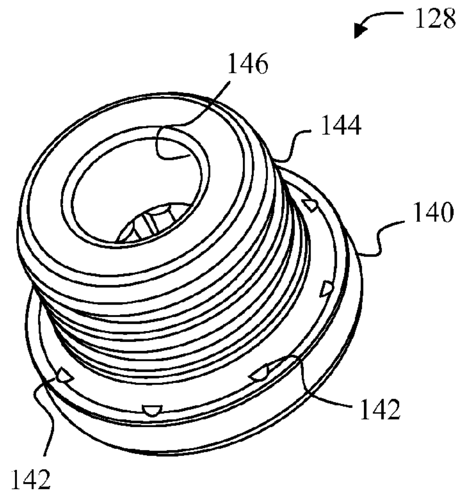
FIG. 3 depicts a top perspective view of the bumper of the device of FIG. 2.
Figure 4:
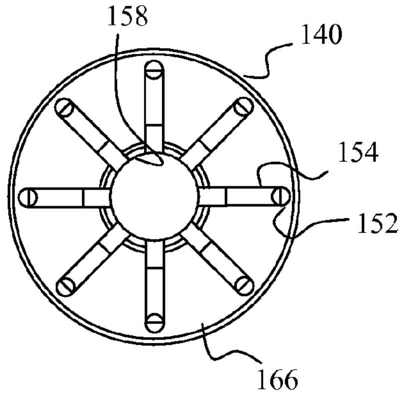
FIG. 4 depicts a bottom plan view of the bumper of the device of FIG. 2.
Figure 5:
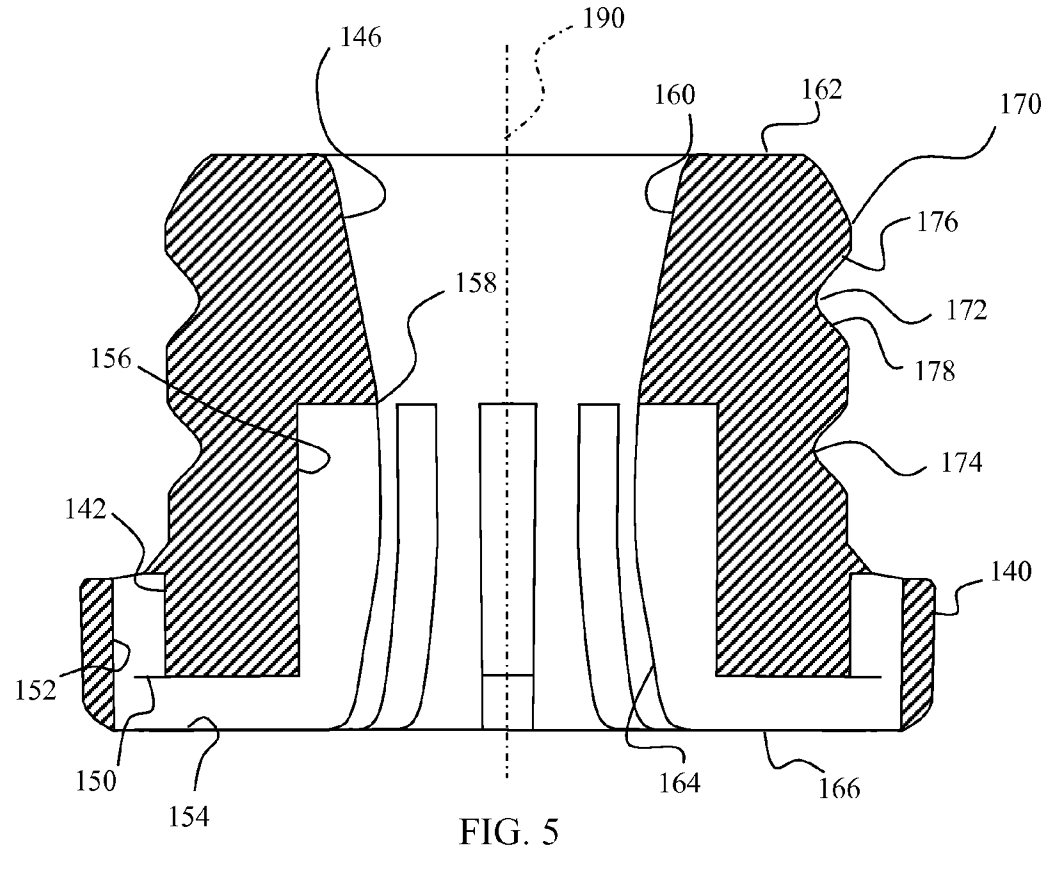
FIG. 5 depicts a cross sectional view of the bumper of the device of FIG. 2 showing vents, flutes and grooves formed in the bumper for cooling and controlled deformation of the bumper.

The bumper 128, shown in additional detail in FIGS. 3-5, includes a flange 140, a number of vents 142, and an extension area 144. A drive bore 146 extends completely through the bumper 128. An inner lip 150 is located between an outer passage 152 and a lower passage 154 in each of the vents 142. Each lower passage 154 communicates with an upwardly extending flute 156 within the drive bore 146.

A portion of the upwardly extending flutes 156 extend in the drive bore 146 along a cylindrical throat 158 which exhibits a uniform diameter. Above the throat 158, an upper conically shaped portion 160 of the drive bore 146 extends outwardly and upwardly to an upper surface 162. Below the throat 158, a lower conically shaped portion 164 of the drive bore 146 extends outwardly and downwardly to a lower surface 166.

An outer surface 170 of the extension area 144 extends between the upper surface 162 and the flange 140. Two grooves 172 and 174 extend radially about the outer surface 170. The groove 172 includes opposing walls 176 and 178 which are set at a right angle (90°) to each other. The groove 174 is similarly shaped.

The bumper 128 in this embodiment is constructed using a microcellular polyurethane elastomer (MPE). MPEs form a material with numerous randomly oriented air chambers. Some of the air chambers are closed and some are linked. Additionally, the linked air chambers have varying degrees of communication between the chambers and the orientation of the linked chambers varies. Accordingly, when the MPE structure is compressed, air in the chambers is compressed. As the air is compressed, some of the air remains within various chambers, some of the air migrates between other chambers and some of the air is expelled from the structure. One such MPE is MH 24-65, commercially available from Elastogran GmbH under the trade name CELLASTO®.

The manner in which the bumper 128 is deformed when subjected to an impact is a function of the particular geometry of the bumper 128, the cylinder 122, and the piston 120. With respect to the cylinder 122, the end portion 130 has a diameter that is closely matched with the diameter of the flange 140. Accordingly, a lip 180, shown in FIG. 2, which extends about the end portion 130 retains the bumper 128 within the end portion 130 of the cylinder 122. The diameter of the extension area 144, however, has a diameter that is less than the diameter of the cylinder 122 resulting in a gap 182 between the outer surface 170 of the bumper 128 and the cylinder 122.

The relative diameters of the extension area 144 and the cylinder 122, and thus the size of the gap 182, is selected to reduce or eliminate contact between the extension area 144 and the cylinder 122 as the bumper 128 is compressed. Contact between the extension area 144 and the cylinder 122 can decrease the working life of the bumper 128. Additionally, the radially formed grooves 172 and 174, the shape of the drive bore 146, and the vents 142 guide the manner in which the bumper 128 deforms as described below.

With initial reference to FIGS. 2-5, operation of the fastener impacting device 100 begins with the fastener impacting device in the configuration of FIG. 2. In FIG. 2, the piston 120 is at the rearward portion of the cylinder 122 and a fastener (not shown) is positioned in the drive channel 126. In this embodiment, the drive blade 124 is configured to extend into the drive bore 146. In other embodiments, the drive blade 124 may be spaced apart, but aligned with, the drive bore 146. Additionally, the drive bore 146 and the drive blade 124 are aligned with the drive channel 126.

When the fastener impacting device 100 is positioned against a work piece, the operator manipulates the trigger 112 resulting in venting of compressed air into the cylinder 122 at a location behind the piston 120 (to the right of the piston 120 as viewed in FIG. 2). The compressed air forces the piston 120 to move in the direction of the arrow 184 of FIG. 2 toward the end portion 130 of the cylinder 122. When the piston 120 reaches the position shown in FIG. 6, the fastener (not shown) has been driven by the drive blade 124 and the kinetic energy remaining in the piston 120 may be transferred to the bumper 128.

Figure 6:
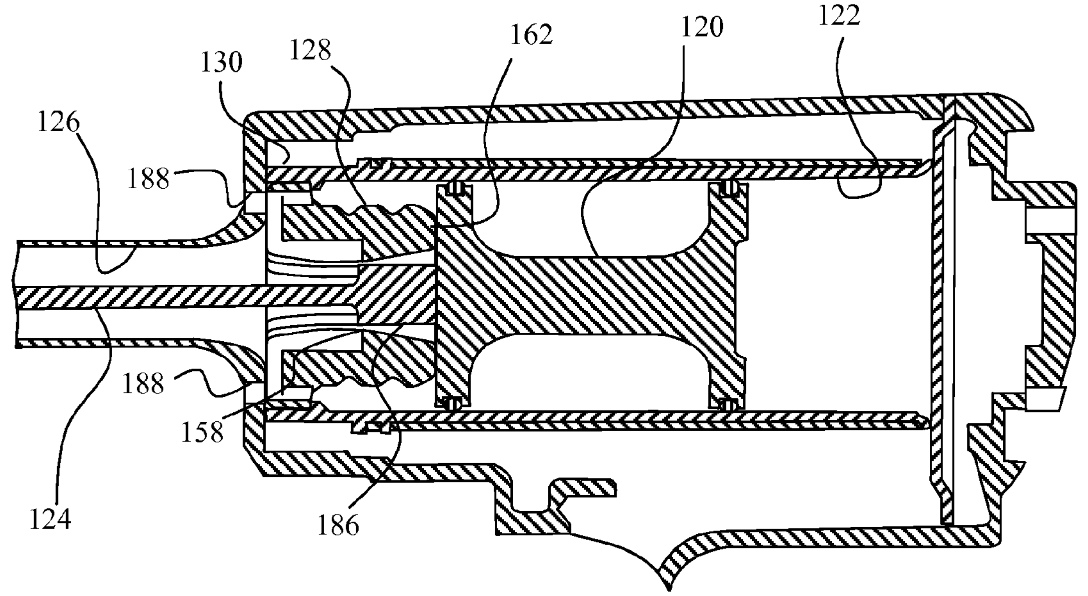
FIG. 6 depicts a partial simplified side cross sectional view of the drive section of the fastener impacting device of FIG. 1 after the device has been fired and the piston has contacted the microcellular polyurethane elastomer bumper but before deformation of the bumper.

In FIG. 6, the piston 120 is in contact with the upper surface 162 of the bumper 128. The throat 158 has a diameter that is larger than the base 186 of the drive blade 124. Thus, the bumper 128 does not contact the drive blade base 186. Continued travel of the piston 120 in the direction of the end portion 130 of the cylinder 122 begins compression of the bumper 128. Air forced out of the bumper 128 is vented through vent holes 188. The vented air removes some of the heat that is generated by the deformation of the bumper 128.

Figure 7:
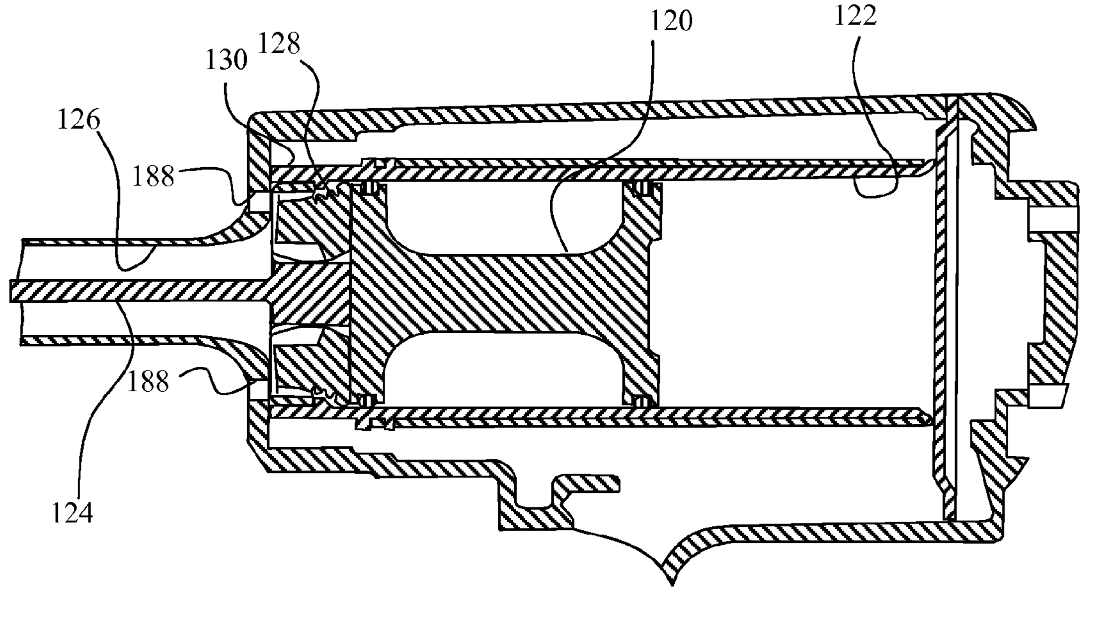
FIG. 7 depicts a partial simplified side cross sectional view of the drive section of the fastener impacting device of FIG. 1 after the microcellular polyurethane elastomer bumper has been deformed showing a gap remaining between the bumper and the cylinder wall and between the bumper and the drive mechanism.

The amount of MPE to be compressed in the bumper 128 has been selected such that when the piston 120 reaches the position shown in FIG. 7, substantially all of the kinetic energy initially in the piston 120 has been transferred to either the driven fastener or the bumper 128. Additionally, as shown in FIG. 7, the size of the throat 158 along with the taper of the upper portion 160 and lower portion 164 of the drive bore 146 has guided deformation of the bumper 128 such that the bumper 128 is not in contact with, or is only slightly in contact with, the drive blade 124 and/or the drive blade base 186. Likewise, the gap 182 resulting from the difference in diameter of the extension area 144 and the cylinder 122, along with the sizing and location of the grooves 172 and 174, have guided deformation of the bumper 128 such that the extension area 144 is not in contact with, or is only slightly in contact with, the cylinder 122.

Once the kinetic energy from the piston 120 has been transferred to the bumper 128, the piston 120 is returned to the position shown in FIG. 2. Movement of the piston 120 away from the bumper 128 allows the resilient characteristic of the bumper 128 to reform into the shape shown in FIG. 2. As the bumper 128 reforms, air is provided through the vents 142 to the upwardly extending flutes and the drive bore 146. Air also flows through the outer passages 152 toward the cylinder 122. This air, in addition to refilling air chambers within the bumper 128, removes additional heat from the bumper 128. The remaining air then passes into the area of the cylinder 122 between the bumper 128 and the piston 120.

One embodiment of a bumper 128 made from MH 24-65 MPE which provides desired kinetic energy transfer and deformation has an overall height of 44 millimeters and includes a flange 140 with a diameter of about 66 millimeters and an extension area 144 with a diameter of 52.6 millimeters. The outer passages 152 and the lower passages 154 have diameters of 4 millimeters and the upwardly extending flutes 156 are 4 millimeters wide, about 6.2 millimeters deep, and extend upwardly along the drive bore 140 to a height of 25 millimeters above the lower surface 166.

The throat 158 has a diameter of 20.1 millimeters and the upper conically shaped portion 160 has a height of 18.1 millimeters and is formed with a cone angle of 20° about a longitudinal axis 190 (see FIG. 5). The lower conically shaped portion 164 has a height of 13.1 millimeters and is formed with a cone angle of 20° about the longitudinal axis 190. The grooves 172 and 174 in this embodiment are about 2 millimeters deep and, at their widest point, are 6.9 millimeters wide. The outer surface 170 extends between the grooves 172 and 174 for a distance of 3.2 millimeters. These dimensions may be modified for different applications or design requirements.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A device for impacting a fastener comprising:

a drive channel;

a cylinder having an end portion that opens to the drive channel;

a microcellular polyurethane elastomer (MPE) bumper fixedly positioned at the end portion of the cylinder, the MPE bumper including a drive bore extending therethrough and aligned with the drive channel, and an outer wall defining a plurality of grooves extending radially about the MPE bumper, wherein (i) the cylinder includes a cylinder wall extending about the MPE bumper, and (ii) the outer wall is spaced apart from the cylinder wall; and a drive mechanism including a drive blade aligned with the drive bore, wherein the MPE bumper further includes a flange extending outwardly from the outer wall, the flange having a diameter substantially the same as the diameter of the cylinder.

2. The device of claim 1, the MPE bumper further comprising:

a plurality of vents, each of the vents including a first passage extending axially within the flange along the MPE bumper and a second passage extending inwardly within the flange toward the drive bore.

3. The device of claim 2, the MPE bumper further comprising:

a plurality of flutes, each of the plurality of flutes extending from a respective one of the plurality of vents axially along the drive bore.

4. The device of claim 3, wherein each of the plurality of flutes extends along the drive bore to a height about one half of the height of the MPE bumper.

5. A device for impacting a fastener comprising:

a drive channel;

a cylinder having an end portion that opens to the drive channel;

a microcellular polyurethane elastomer (MPE) bumper fixedly positioned at the end portion of the cylinder, the MPE bumper including a drive bore extending therethrough and aligned with the drive channel, and an outer wall defining a plurality of grooves extending radially about the MPE bumper; and a drive mechanism including a drive blade aligned with the drive bore, wherein the drive bore comprises (i) a throat portion, (ii) a first conical portion extending upwardly and outwardly from the throat portion toward an upper surface of the MPE bumper, and (iii) a second conical portion extending downwardly and outwardly from the throat portion toward a lower surface of the MPE bumper.

6. A device for impacting a fastener comprising:

a drive channel;

a cylinder including a first end portion in communication with the drive channel, a second end portion spaced apart from the first end portion, and a cylinder wall extending between the first end portion and the second end portion;

a microcellular polyurethane elastomer (MPE) bumper fixedly positioned at the first end portion of the cylinder, the MPE bumper including a drive bore extending axially therethrough and aligned with the drive channel, and an outer wall extending radially about the MPE bumper, the outer wall spaced apart from the cylinder wall about the circumference of the cylinder; and a drive mechanism including a drive blade aligned with the drive bore, wherein the drive bore comprises (i) a throat portion, (ii) a first conical portion extending upwardly and outwardly from the throat portion toward an upper surface of the MPE bumper, and (iii) a second conical portion extending downwardly and outwardly from the throat portion toward a lower surface of the MPE bumper.

7. The device of claim 6, further comprising:

a plurality of flutes extending axially within the drive bore along the second conical portion and the throat portion, each of the plurality of flutes terminating at a location at or about the height of a junction between the throat portion and the first conical portion.

8. The device of claim 6, the outer wall defining a plurality of grooves extending radially about the MPE bumper.

9. The device of claim 8, wherein each of the plurality of grooves extends radially about the entire circumference of the MPE bumper.

10. A device for impacting a fastener comprising:

a drive channel;

a cylinder including a first end portion in communication with the drive channel, a second end portion spaced apart from the first end portion, and a cylinder wall extending between the first end portion and the second end portion;

a microcellular polyurethane elastomer (MPE) bumper fixedly positioned at the first end portion of the cylinder;

a drive bore extending axially from an upper surface of the MPE bumper to a lower surface of the MPE bumper and aligned with the drive channel;

a throat portion within the drive bore;

a first conical portion within the drive bore extending upwardly and outwardly from the throat portion toward the upper surface of the MPE bumper; and a drive mechanism including a drive blade aligned with the drive bore, and configured to impact the upper surface of the MPE bumper, wherein the drive bore further comprises a second conical portion extending downwardly and outwardly from the throat portion toward a lower surface of the MPE bumper.

11. The device of claim 10, the MPE bumper further comprising:

an outer wall extending radially about the MPE bumper, the outer wall spaced apart from the cylinder wall about the circumference of the cylinder.

12. The device of claim 10, wherein the throat portion is cylindrical.

13. The device of claim 10, the MPE bumper further comprising:

an outer wall defining a plurality of grooves extending radially about the MPE bumper.

14. The device of claim 13, wherein the outer wall is spaced apart from the cylinder wall about the circumference of the cylinder.

* * * * *